UNITED STATES PATENT OFFICE.

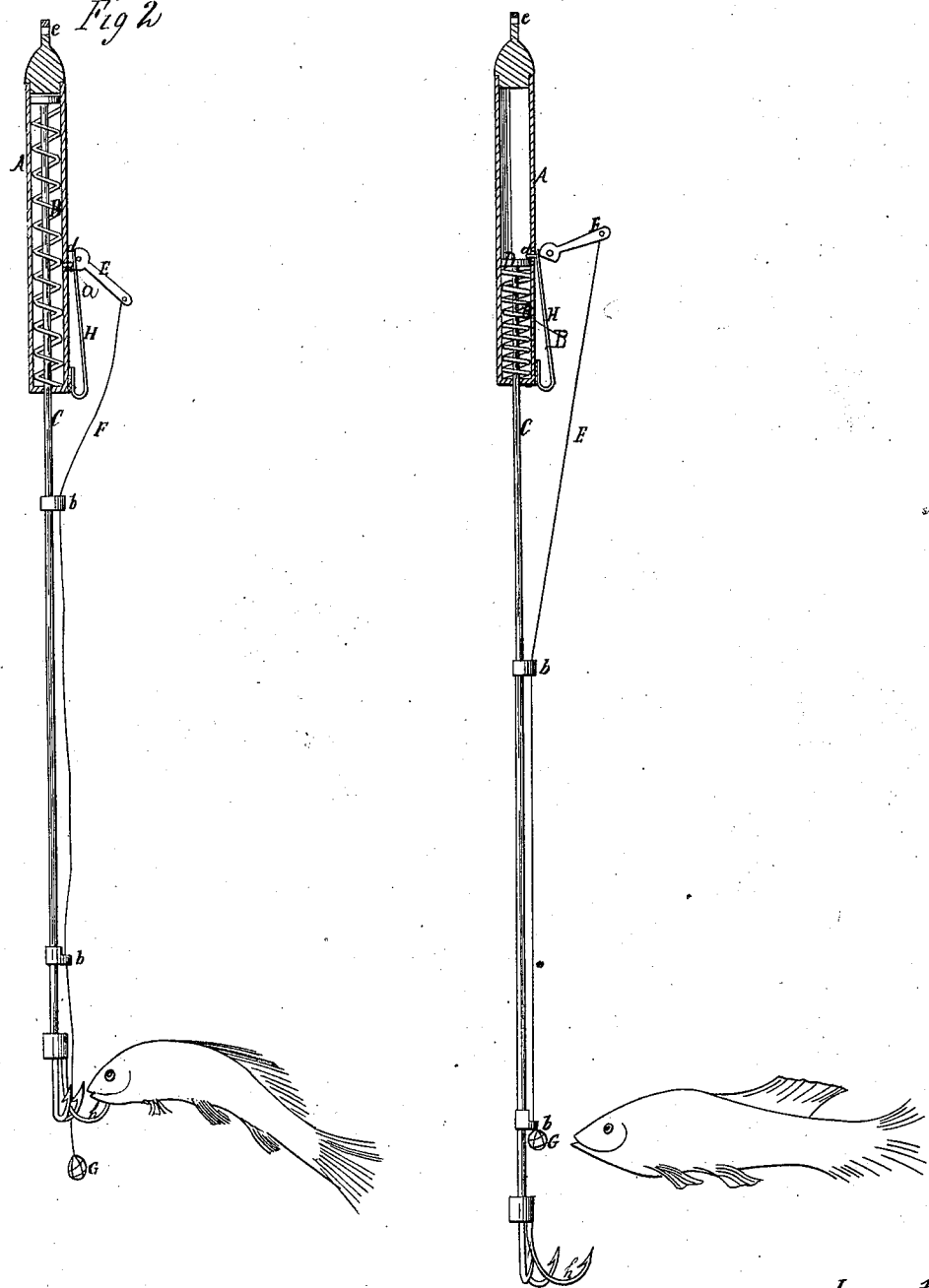

A. J. LENHART, OF TRENTON, NEW JERSEY.

IMPROVEMENT IN FISHING-TACKLE.

Specification forming part of Letters Patent No. 43,694, dated August 2, 1864.

*To all whom it may concern:*

Be it known that I, A. J. LENHART, of Trenton, in the county of Mercer and State of New Jersey, have invented a new and useful Improvement in Fishing-Tackle; and I do hereby declare that the following is a full, clear, and exact description thereof, which will enable those skilled in the art to make and use the same, reference being had to the accompanying drawings, forming part of this specification, in which—

Figure 1 is a side sectional elevation of my improvement, showing it set in position for fishing. Fig. 2 is a side sectional elevation of the same, showing its operation in hooking the fish.

Similar letters of reference indicate corresponding parts.

This invention pertains to that class of devices in which the hooks are operated by a spring.

Some of these devices are commonly known as "sockdolagers;" but the designation which I propose to give to my improvement is "the sure pop."

A is a metallic case or tube, made in the form of a common fishing-sinker, in lieu of which it is intended to serve. Within the hollow sinker A is a spiral spring, B. Extending up into the sinker A, through the spring B, is the fish-hook rod C, the upper end of which has a head, D, which covers the upper end of the spring B, so that when the rod C is moved down it will compress the spring, and when the rod C is liberated the spring B will throw up the rod C with a force and rapidity corresponding to the strength of the spring.

The lower end of the rod C is to be furnished with one or more fish-hooks, $h$, of any desired size or pattern, attached as shown, or in any other suitable manner.

Upon the outside of the hollow sinker A, I attach by one end a spring, H, while the other end is free and has a point or catch, $a$, upon it, which enters the sinker A through a perforation, as shown. I also attach upon the outside of the sinker A a small lever or trigger, E, the inner end of which is pivoted between lugs $d$ upon the sinker A, as shown. The said inner end of the trigger E is arranged to press upon the free end of the spring H, and one side of the extremity of trigger E is flattened, so that when the trigger is turned obliquely, as in Fig. 2, it will liberate the spring D and allow it to move outward, but when the trigger is turned so as to stand at right angles to the sinker A, as in Fig. 1, the spring D and its catch $a$ will be pressed inward.

Attached to the outer end of the trigger E is a bait cord or line, F, which passes down through guide-loops $b\,b$, fastened upon the rod C, as shown. The lower end of the line F terminates in or is attached to a bait net or ball, G, containing or composed of any suitable fish-bait.

The operation is as follows: The tackle is to be attached by the loop $c$ in the upper end of the sinker to a fish-line, (or it may be fastened to the end of a pole,) and it is then set by drawing down the rod C and pressing the catch $a$ inward, so that the catch $a$ will pass in beyond the head D of the rod C and prevent it from rising, the catch $a$ being held in this position by moving the lever E to a horizontal, or nearly horizontal, position, as shown in Fig. 1. Thus arranged the device is set for fishing, and is to be lowered into the water. When the fish approaches and jerks the bait G the line F will be pulled and the lever E will be brought to an oblique position, as shown in Fig. 2, by which movement of the lever E the catch $a$, being liberated, moves out away from the head D of the rod C, and the latter is then thrown suddenly up by the force of the spring B, and the hooks are driven into or hook the fish in the manner shown in Fig. 2.

I do not confine myself to the use of any especial material or to any particular form or size of the parts here indicated, for they may be varied to suit the purposes required.

Having thus described my invention, I claim as new and desire to secure by Letters Patent—

1. The combination of the hollow sinker A, spring B, and hook-rod C, substantially in the manner herein shown and described.

2. The combination, with the above-named parts, of the spring H, trigger E, and bait-line F, operating together, substantially in the manner herein shown and described.

ADAM J. LENHART.

Witnesses:
WM. T. MCNAMARA,
J. P. HALL.